United States Patent [19]

Adam

[11] 4,224,228
[45] Sep. 23, 1980

[54] WATER-SOLUBLE ANTHRAQUINONE DYES

[75] Inventor: Jean-Marie Adam, Saint-Louis, France

[73] Assignee: Ciba-Geigy Corporation, Ardsley, N.Y.

[21] Appl. No.: 971,134

[22] Filed: Dec. 19, 1978

Related U.S. Application Data

[63] Continuation of Ser. No. 908,477, May 22, 1978, abandoned.

[30] Foreign Application Priority Data

May 26, 1977 [LU] Luxembourg ............................ 77418
Nov. 3, 1977 [LU] Luxembourg ............................ 78437

[51] Int. Cl.² ......................................... C07C 143/665
[52] U.S. Cl. .................................... 260/372; 260/373; 260/374
[58] Field of Search ................. 260/372, 373, 377, 380

[56] References Cited

U.S. PATENT DOCUMENTS

| | | | |
|---|---|---|---|
| 2,053,275 | 9/1936 | Ellis et al. | 260/377 |
| 2,580,190 | 12/1951 | Peter et al. | 260/373 |
| 3,491,125 | 1/1970 | Schwander et al. | 260/377 |
| 3,823,168 | 7/1974 | Hohmann et al. | 260/377 |

FOREIGN PATENT DOCUMENTS

| | | | |
|---|---|---|---|
| 724725 | 5/1969 | Belgium . | |
| 851071 | 9/1970 | Canada . | |
| 440505 | 12/1967 | Switzerland | 260/372 |

*Primary Examiner*—Winston A. Douglas
*Assistant Examiner*—Raymond K. Covington
*Attorney, Agent, or Firm*—Prabodh I. Almaula

[57] ABSTRACT

There are described new violet water-soluble anthraquinone dyes of the formula

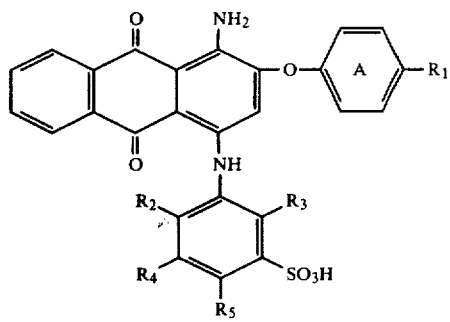

wherein
  $R_1$ represents a straight-chain or branched-chain alkyl group having 4 to 8 carbon atoms,
  $R_2$ and $R_3$ independently of one another represent a straight-chain or branched-chain alkyl group having 1 to 4 carbon atoms,
  $R_4$ represents hydrogen, an optionally acylated amino group, or a fibre-reactive radical bonded by way of an amino group,
  $R_5$ represents hydrogen, or a straight-chain or branched-chain alkyl group having 1 to 4 carbon atoms, and the phenylene ring
  A can be further substituted;

processes for producing them; as well as the use thereof for dyeing and printing textile materials, particularly natural and synthetic polyamide materials.

21 Claims, No Drawings

WATER-SOLUBLE ANTHRAQUINONE DYES

This is a continuation of application Serial No. 908,477 filed on May 22, 1978, now abandoned.

The invention relates to new water-soluble anthraquinone dyes, to processes for producing these dyes, to their use for dyeing or printing textile materials, particularly natural and synthetic polyamide materials, and also to the textile material dyed and printed with these new anthraquinone dyes.

Violet dyes which have good affinity for natural and synthetic polyamide material are much sought after. From the German Patent Specification No. 821,384, there are known violet milling dyes of the anthraquinone series; however, these dyes have poor affinity for polyamide materials.

It has now been found that by reaction of specific mono- or disulphonated anthraquinone compounds with melted p-alkylphenols, or by a selective monosulphonation of 1-amino-2-p-alkylphenoxy-4-phenylamino-anthraquinones in the phenyl nucleus in the 4-position, there are obtained violet anthraquinone-monosulphonic acids having a p-alkylphenoxy group in the 2-position, which have very good affinity for polyamide materials.

The invention thus relates to new water-soluble anthraquinone dyes which, in the form of the free acid, correspond to the formula I

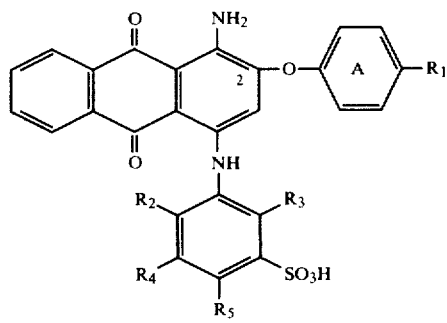

wherein
$R_1$ represents a straight-chain or branched-chain alkyl group having 4 to 8 carbon atoms,
$R_2$ and $R_3$ independently of one another represent a straight-chain or branched-chain alkyl group having 1 to 4 carbon atoms,
$R_4$ represents hydrogen, an optionally acylated amino group, or a fibre-reactive radical bonded by way of an amino group,
$R_5$ represents hydrogen, or a straight-chain or branched-chain alkyl group having 1 to 4 carbon atoms, and the phenylene ring
A can be further substituted.

As a straight-chain or branched-chain alkyl group having 4 to 8 carbon atoms, $R_1$ represents for example the following groups: the n-, sec- or tert-butyl group; and the n-, sec- or tert-pentyl, hexyl, heptyl or octyl group; in preferred anthraquinone compounds, $R_1$ represents a branched-chain alkyl group having 4 to 8 carbon atoms, especially the tert-butyl group.

As a straight-chain or branched-chain alkyl group having 1 to 4 carbon atoms, $R_2$, $R_3$ and $R_5$ represent, for example, the methyl, ethyl, n- and iso-propyl groups and the n-, sec- and tert-butyl groups. In preferred anthraquinone compounds, $R_2$ and $R_3$ each represent the methyl group, and $R_5$ represents an alkyl group having 1 to 2 carbon atoms.

If $R_4$ represents an amino group, this can be monosubstituted on the N atom; for example it is an alkylamino group, such as the methylamino or ethylamino group.

If $R_4$ represents an acylated amino group, these $R_4$ groups correspond in particular to the formula —NH—CO.X or —NHSO$_2$X wherein X represents an alkyl group, especially the methyl group, or an aryl group, particularly the phenyl group.

If $R_4$ represents an amino group to which a fibre-reactive radical is bonded, these $R_4$ groups correspond to the formula —NHZ, wherein Z represents a fibre-reactive radical.

By a fibre-reactive radical Z is meant a radical containing one or more reactive groups or substituents that can be split off, which are able to react on application of the dyes to, for example, superpolyamide fibres, such as wool, with the NH—groups of these fibres to form covalent bonds. Fibre-reactive groupings of this kind are known in large numbers from the literature.

Suitable fibre-reactive groups Z are for example those of the aliphatic series, such as acryloyl, mono-, di- or trichloroacryloyl or mono-, di- or tribromoacryloyl, such as —CO—CH=CH—Cl, —CO—CCl=CH$_2$, —CO—CH=CH—Br, —CO—CBr=CH$_2$, —CO—CBr=CHBr, —CO—CCl=CH—CH$_3$, also —CO—CCl=CH—COOH, —CO—CH=CCl—COOH, and β-chloropropionyl, 3-phenylsulphonylpropionyl, 3-methylsulphonylpropionyl, β-sulphatoethylaminosulphonyl, vinylsulphonyl, β-chloroethylsulphonyl, β-sulphatoethylsulphonyl, β-methylsulphonylethylsulphonyl, β-phenylsulphonylethylsulphonyl, 2-fluoro-2-chloro-3,3-difluorocyclobutane-1-carbonyl, 2,2,3,3-tetrafluorocyclobutanecarbonyl-1 or -sulphonyl-1 groups, or β-(2,2,3,3-tetrafluorocyclobutyl-1)-acryloyl groups, or α- or β-alkyl- or -arylsulfphonylacryloyl groups, such as α- or β-methylsulphonylacryloyl.

Reactive radicals particularly suitable for polyamide, especially for wool, are, for example: chloroacetyl, bromoacetyl, α,β-dichloro- or α-β-dibromopropionyl, α-chloro- or α-bromacroyl, 2,4,6-trifluoropyrimidyl-5 or 2,4,6-trifluorotriazinyl groups, as well as fluorotriazinyl groups of the formula

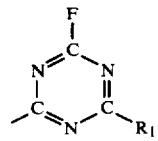

wherein $R_1$ represents an optionally substituted amino group or an optionally etherified oxy or thio group, such as the NH$_2$ group, an amino group mono- or disubstituted with C$_1$–C$_4$-alkyl groups, a C$_1$–C$_4$-alkoxy group, a C$_1$–C$_4$-alkylmercapto group, arylamino, especially phenylamino, or phenylamino, phenoxy, mono- or disulphophenyloxy, etc., substituted with methyl, methoxy, chlorine and particularly sulpho. Examples of such triazine compounds are: 2,4-difluoro-6-aminotriazine, 2,4-difluoro-6-methylaminotriazine, 2,4-difluoro-6-ethylaminotriazine, 2,4-difluoro-6-phenylaminotriazine, 2,4-difluoro-6-(2'-, 3'- or 4'-sulphophenyl)aminotriazine, 2,4-difluoro-6-(2',4'- or 3',4'- or 2',5'- or 4',5'-disulphophenyl)-aminotriazine, 2,4-difluoro-6-dimethylaminotriazine, 2,4-difluoro-6-methoxytriazine, 2,4-difluoro-6-(β-methoxyethoxy)-triazine, 2,4-difluoro-6-methylmercaptotriazine or 2,4-difluoro-6-phenylmercaptotriazine.

Reactive radicals Z which are particularly preferred are the α-bromoacrylcyl group and the α,β-dibromopropionyl group. The first-mentioned can be introduced by means of bromoacrylic acid chloride, or from the α,β-dibromopropionyl group by splitting off hydrogen bromide. This applies analogously also to the α-chloroacrylic group. Likewise of interest are the 4,6-difluorotriazinyl-(2) group or the 4-fluoro-6-alkyl- or -arylaminotriazinyl-(2) groups.

In preferred anthraquinone dyes of the formula I, $R_4$ represents hydrogen.

If the phenylene group "A" is further substituted, suitable substituents are, for example: halogen such as fluorine, chlorine or preferably bromine, as well as the radical —$CH_2$—Nh—CO—Y wherrein Y represents an alkyl group or alkylene group optionally mono- or di-substituted by halogen, such as fluorine, chlorine or bromine, or an unsubstituted phenyl group, or a phenyl group mono- or polysubstituted by, for example, halogen or alkyl ($C_1$-$C_4$).

A particularly interesting anthraquinone dye corresponds to the formula I wherein $R_1$ represents the tert-butyl group, $R_2$, $R_3$ and $R_5$ each represent the methyl group, and $R_4$ represents hydrogen, and wherein the phenylene ring A is not further substituted.

The new water-soluble anthraquinone dyes of the formula I are violet dyes of which the dyeings on polyamide materials are characterised in particular by good affinity, good build-up properties and pure shades, and by good fastness to wet-processing, such as fastness to hot water, to perspiration and to washing.

The new anthraquinone dyes of the formula I are obtained by reacting an anthraquinone compound which, in the form of the free acid, corresponds to the formula II

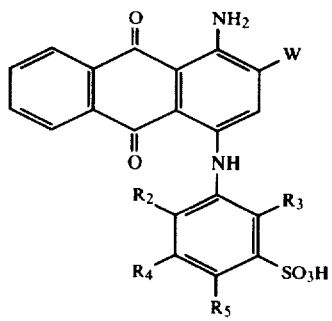

(II), wherein the symbols $R_2$, $R_3$, $R_4$ and $R_5$ have the aforesaid meanings, and W represents the $SO_3H$ group or halogen, partiularly bromine, with a p-alkylphenol of the formula III

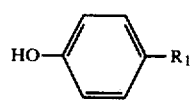

(III), wherein $R_1$ has the meaning given above, in the presence of acid-binding agents, at elevated temperature, to give an anthraquinone compound of the formula Ia

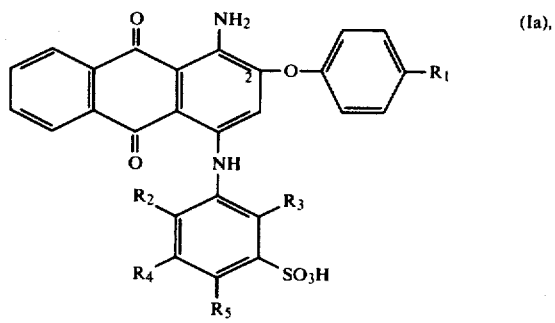

(Ia), wherein the symbols $R_1$, $R_2$, $R_3$, $R_4$ and $R_5$ have the aforesaid meanings;

and optionally further substituting the phenylene ring of the phenoxy group in the 2-position of the anthraquinone nucleus.

A further possibility for producing the anthraquinone dyes of the formula I consists of selectively monosulphonating an anthraquinone compound of the formula IV

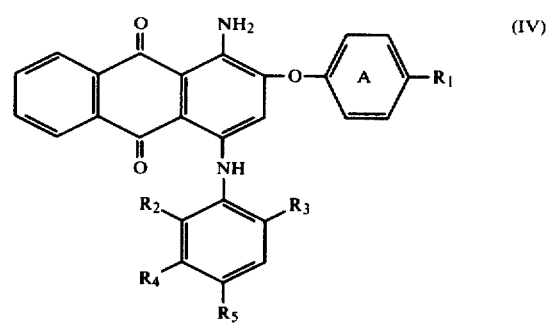

(IV)

wherein the symbols $R_1$, $R_2$, $R_3$, $R_4$, $R_5$ and A have the aforesaid meanings.

This selective monosulphonation is effected, for example, by reacting an anthraquinone compound of the formula IV with oleum containing 1 to 65 percent by weight, particularly 20 to 30 percent by weight, and especially 25 percent by weight, of free sulphur trioxide, at a temperature of 0° to 5° C., in particular at 0° to 2° C.

A further possibility for selective monosulphonation of an anthraquinone compound of the formula IV consists of reacting this compound with chlorosulphonic acid in a halogenated hydrocarbon at a temperature of 50° to 80° C.

Suitable halogenated hydrocarbons are aromatic hydrocarbons such as monochlorobenzene or dichlorobenzene, as well as, in particular, aliphatic hydrocarbons such as trichloroethylene, and especially carbon tetrachloride.

In the case where the radical $R_4$ in the anthraquinone dyes of the formula I represents an acylated amino group or a fibre-reactive radical —NHZ, it is advantageous to use a starting compound of the formula II or IV in which $R_4$ represents an amino group which can be acylated, and to react this with the phenol of the formula III, or to selectively monosulphonate it. These reaction products can then be subsequently reacted with a compound introducing the acyl group or the fibre-reactive radical Z to yield an acylated or fibre reactive anthraquinone dye. Acyl compound suitable for this purpose are, for example, those on which the reactive groups mentioned are based, in general halides, particularly chlorides, of the stated components, the condensation reaction being generally performed in an aqueous or organic medium, and in an alkaline to acid range.

The compounds of the formulae II and III are known and can be produced by known methods.

A suitable compound corresponding to the formula II is, for example: 1-amino-4-mesidinoanthraquinone-2,3'-disulphonic acid or 1-amino-2-bromo-4-mesidinoanthraquione-3'-sulphonic acid; and a suitable compound corresponding to the formula III is p-tert-butylphenol or p-tert-amylphenol.

The reaction of the anthraquinone compound of the formula II with the p-alkylphenol of the formula III is performed preferably at a temperature of 180° to 240° C., particularly at 220° C., and this reaction is preferably carried out with a melt of the phenol of the formula III.

Suitable acid-binding agents are, for example, the hydroxides of alkali metals, preferably those of potassium and sodium, such as potassium hydroxide or sodium hydroxide.

Likewise known are the compounds of the formula IV wherein $R_4$ represents hydrogen. The compounds of the formula IV wherein $R_4$ represents an optionally acylated amino group, or a fibre-reactive radical bonded by way of an amino group, are new and constitute further subject matter of the present invention. All these compounds of the formula IV are obtained by means of an analogous phenol melt according to the reaction of the compound of the formula II with a compound of the formula III; in this reaction sequence, however, the compound of the formula II in the phenyl ring in the 4-position does not contain an $SO_3H$ group.

If the phenylene ring A of the anthraquinone compound of the formula I is further substituted, e.g. by the stated group $-CH_2-NH-CO-Y$, such compounds are produced, for example, by a process wherein the anthraquinone compound of the formula I or Ia is subsequently reacted according to Tscherniak-Einhorn with an N-methylolamide carrying on the N atom the group $-COY$, in an acid medium, preferably in concentrated sulphuric acid.

If the phenylene ring A of the anthraquinone compound of the formula I is further substituted, for example by halogen, the compounds of the formula I or Ia are likewise subsequently halogenated by known methods, for example in bromine/acetic acid or in hydrochloric acid.

The new anthraquinone dyes free from fibre-reactive groups are used in particular for dyeing or printing natural and synthetic polyamide materials, such as wool and nylon.

If they are fibre-reactive anthraquinone dyes, they can be used for dyeing or printing cellulose materials or natural and synthetic polyamide materials, and for dyeing mixed fabrics, for example those made from wool and cellulose.

The invention is further illustrated by the following Examples but is not limited to them. The term 'parts' denotes parts by weight, and the temperatures are given in degrees Centigrade.

EXAMPLE 1

45.8 Parts of the condensation product from 1-amino-4-bromoanthraquinone-2-sulphonic acid with 2,4,5-trimethylaniline (mesidine) are dissolved in 300 parts of 10% oleum, and stirring is maintained at 30°-40° until no further starting material can be detected by thin-layer chromatography. The sulphonation mixture is poured into an ice/salt water mixture; the precipitated sulphonation product is filtered off with suction, washed with salt water until neutral and then dried. The disulphonic acid thus obtained is subsequently introduced into a melted mixture of 200 parts of p-tert-butylphenol and 60 parts of a 50% potassium hydroxide solution. With removal of the water by distillation, the temperature is raised to 220° C. and the melt is stirred for 4 hours at this temperature. At 120° it is diluted with 1000 parts of a 10% sodium hydroxide solution; the dye is subsequently filtered off with suction, and washed with warm water. The crude dye is suspended in water, and the suspension is made acid to Congo red; the p-tert-butylphenol which is still adhering is then separated by steam distillation. The suspension is now brought to pH 7 with sodium hydroxide solution; it is afterwards heated to 80° and 5% sodium chloride is added. The precipitated dye of the formula

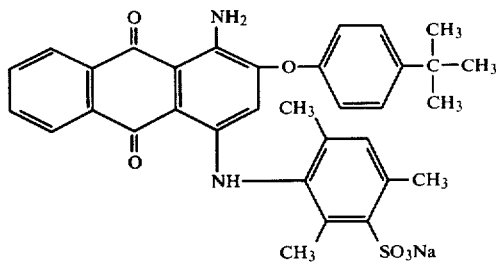

is filtered off with suction and dried. The dye exhibits an excellent build-up on synthetic polyamide fibres, which it dyes in pure violet shades having fastness to light and to wet processing.

Similar violet dyes are also obtained if the 45.8 parts of the condensation product from 1-amino-4-bromoanthraquinone-2-sulphonic acid with 2,4,6-trimethylaniline are replaced by 44.6 Parts of the condensation product from 1-amino-4-bromoanthraquinone-2-sulphonic acid with 2,6-dimethylaniline (vic. xylidene), or by 45.8 parts of the condensation product from 1-amino-4-bromoanthraquinone-2-sulphonic acid with 2-methyl-6-ethylaniline.

EXAMPLE 2

45.3 parts of 1-amino-2-bromo-4-mesidinoanthraquinone are dissolved in 300 parts of sulphuric acid monohydrate at 25°, and 75 parts of 66% oleum are added dropwise, during which time the temperature has not to exceed 40°. Stirring proceeds at 30°-40° until a sample is completely soluble in sodium carbonate solution. The reaction mixture is poured into ice/water; there is added 10% by volume of sodium chloride, and the precipitate is filtered off; it is then washed with a 10% salt solution until neutral and subsequently dried. The 1-amino-2-bromo-4-mesidinoanthraquinone-3'-sulphonic acid thus obtained is introduced into a melted mixture of 200 parts of p-tert-butylphenol and 60 parts of a 50% potassium hydroxide solution. As the water is being removed by distillation, the temperature rises to 200°, and condensation is allowed to proceed at 200° for 15 hours. After completion of the reaction, the dye of the formula

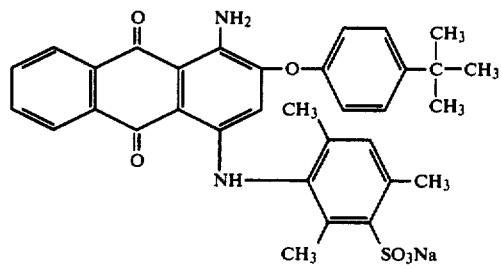

is separated as in Example 1 by precipitation with a 10% sodium hydroxide solution and processed. The dye is obtained as a violet powder which dissolves in water to give a violet colour; the dye displays on polyamide fibres the same dyeing properties as the dye of Example 1.

EXAMPLE 3

80 Parts of a 50% potassium hydroxide solution is introduced into 200 parts of melted p-tert-butylphenol, and the temperature of the melt rises to 180° as water is distilled off. There are added 53.1 parts of the condensation product from 1-amino-4-bromoanthraquinone-2-sulphonic acid and 2,6-diaminomesitylene-4-sulphonic acid, and stirring is continued for 4 hours at 220°. The temperature is allowed to fall to 100°; the mixture is diluted with 1000 parts of water, and the dye base which has precipitated is filtered off. The p-tert-butylphenol still present is distilled off with steam, as in Example 1.

6 parts of this base are dissolved in 60 parts of water at pH 7. There is then added dropwise in 10 minutes at 15°–20° 1 parts of acetyl chloride, during which time the pH value of the reaction mixture is held at 6.5–7.5 by the addition of a 5% sodium hydroxide solution, and stirring is continued at 15°–20° for a further 3 hours. By the addition of 10% by volume of sodium chloride, the acylated dye of the formula

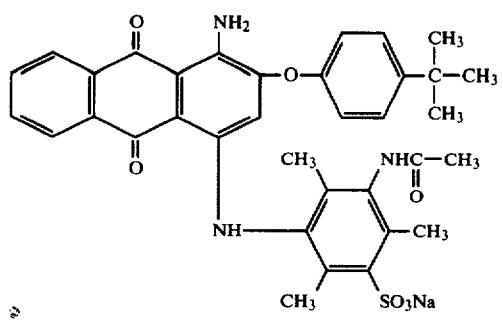

is precipitated to yield a water-soluble, bluish-violet powder which has a very good affinity for polyamide.

Similar dyes having equally good dyeing properties are also obtained by replacing in the above Example the 200 parts of p-tert-butylphenol by 200 parts of p-tert-amylphenol, or by 200 parts of isooctylphenol.

EXAMPLE 4

6 Parts of the dye according to Example 1 are dissolved with 1.5 parts of N-methylolchloroacetamide portionwise in 25 parts of 95% sulphuric acid at 0°–5°, and stirring proceeds at 0°–5° for a further 15 hours; the reaction mixture is then poured into ice/water, and the dye which precipitates is filtered off with suction. The residue is suspended in water, and the pH value is adjusted to 7 with sodium hydroxide solution. By the addition of 5 vol.% of sodium chloride, the sodium salt of the dye of the formula

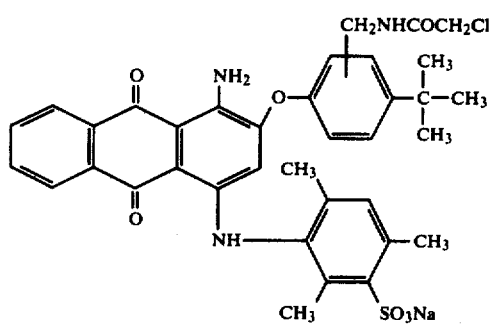

is precipitated. This dyes polyamide fibres in violet shades, with very good affinity and with good fastness to wet processing.

EXAMPLE 5

A dye bath is prepared from 4000 parts of water, 4 parts of ammonium acetate, 2 parts of the dye according to Example 1 and an amount of acetic acid sufficient to bring the pH value of the bath to 6.0. 100 parts of a synthetic polyamide knitted fabric are introduced into the dye bath obtained; the bath is heated within half an hour to boiling, and the material is dyed at 100° for 45 minutes. A violet dyeing showing the good affinity of the dye for the material is obtained.

EXAMPLE 6

50 Parts of the anthraquinone base of the formula

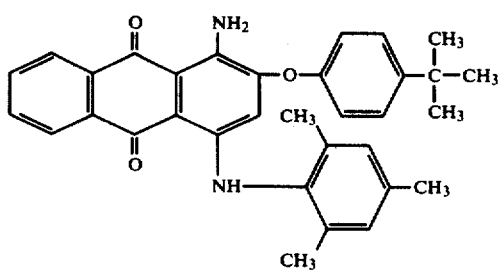

are dissolved in 500 parts of sulphuric acid monohydrate at 0° to 5°. There are added at 0° to 5° 95 parts of 25% oleum, and the sulphonation mixture is poured into an ice/water mixture. The precipitated monosulphonic acid of the formula

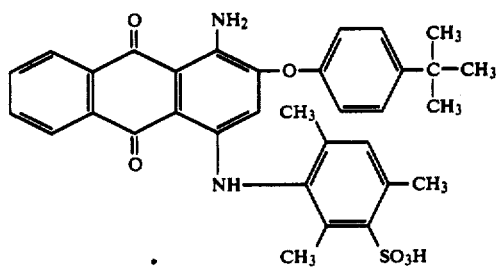

is filtered off with suction; it is suspended in water, the pH value is adjusted to 7 with NaOH, and 2% of sodium chloride per volume of dye is added to the neutral solution. The precipitated sodium salt of the dye is filtered off with suction, and washed with a 2% sodium chloride solution.

The dye exhibits an excellent build-up on synthetic polyamide fibres, which it dyes in pure violet shades having fastness to light and to wet-processing.

A dye having similar properties is obtained by replacing the 50 parts of 1-amino-2-p-tert-butylphenoxy-4-mesidinoanthraquinone by 56 parts of 1-amino-2-p-isooctylphenoxy-4-mesidinoanthraquinone, and proceeding otherwise as described above.

EXAMPLE 7

5 Parts of 1-amino-2-p-tert-butylphenoxy-4-mesidinoanthraquinone are dissolved in 150 parts of carbon tetrachloride, and 2 parts of chlorosulphonic acid are added. The reaction mixture is stirred for 24 hours at 70°, and the precipitated dye of the formula

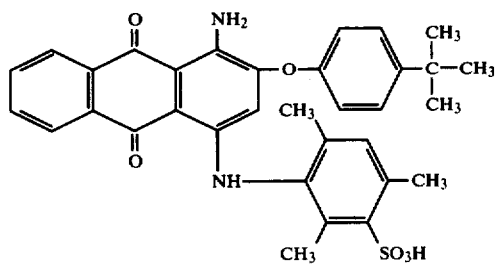

is filtered off with suction and washed with carbon tetrachloride. The sodium salt of the dye exhibits on polyamide fibres the same dyeing properties as are exhibited by the dye of Example 6.

I claim:

1. A new water-soluble anthraquinone dye which, in the form of the free acid, corresponds to the formula [I]

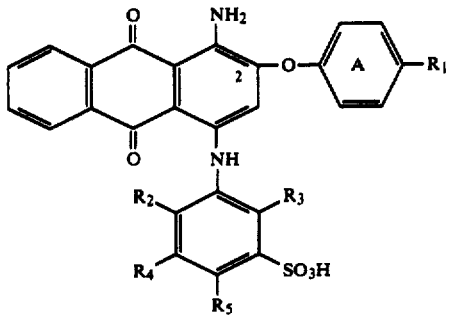

wherein
$R_1$ represents a straight or branched alkyl group having 4 to 8 carbon atoms,
$R_2$ and $R_3$ independently of one another represent a straight or branched alkyl group having 1 to 4 carbon atoms,
$R_4$ represents hydrogen, an optionally acylated amino group, or a fibre-reactive radical bonded by way of an amino group,
$R_5$ represents hydrogen, or a straight or branched alkyl group having 1 to 4 carbon atoms.

2. A new water-soluble anthraquinone compound according to claim 1, wherein $R_1$ is a branched alkyl group having 4 to 8 carbon atoms,
$R_1$ represents a straight or branched alkyl group having 4 to 8 carbon atoms,
$R_2$ and $R_3$ independently of one another represents a straight or branched alkyl group having 1 to 4 carbon atoms,
$R_4$ represents hydrogen, an optionally acylated amino group, or a fibre-reactive radical bonded by way of an amino group
$R_5$ represents hydrogen, or a straight or branched alkyl group having 1 to 4 carbon atoms,
which process comprises reacting an anthraquinone compound which, in the form of the free acid, corresponds to the formula [II]

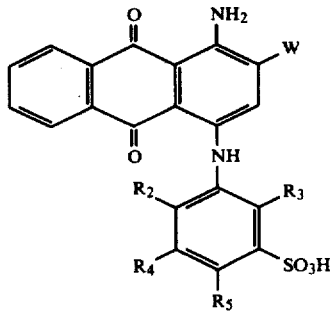

wherein the symbols $R_2$, $R_3$, $R_4$ and $R_5$ have the aforementioned meanings, and w represents the $SO_3H$ group or halogen, particularly bromine, with a p-alkylphenol of the formula [III]

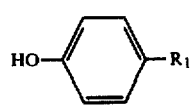

wherein
R₁ has the meaning given above, in the presence of acid-binding agents, at elevated temperature, to give an anthraquinone dye of the formula Ia

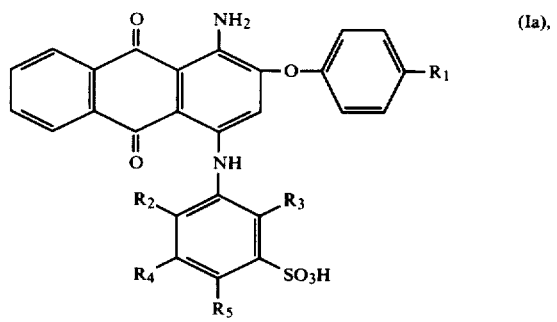

wherein the symbols $R_1$, $R_2$, $R_3$, $R_4$ and $R_5$ have the aforesaid meanings.

3. A new water-soluble anthraquinone compound according to claim 2, wherein $R_1$ represents the tert-butyl group.

4. A new water-soluble anthraquinone compound according to claims 1 to 3, wherein $R_2$ and $R_3$ each represent the methyl group.

5. A new water-soluble anthraquinone compound according to claims 1 to 4, wherein $R_4$ represents hydrogen.

6. A new water-soluble anthraquinone compound according to claims 1 to 5, wherein $R_5$ represents a straight-chain alkyl group having 1 or 2 carbon atoms.

7. A new water-soluble anthraquinone compound according to claim 1, wherein $R_1$ represents the tert-butyl group, $R_2$, $R_3$ and $R_5$ each represent the methyl group, and $R_4$ represents hydrogen, and the phenylene ring A is not further substituted.

8. A process for producing new water-soluble anthraquinone dyes according to claim 1 which, in the form of the free acid, correspond to the formula I

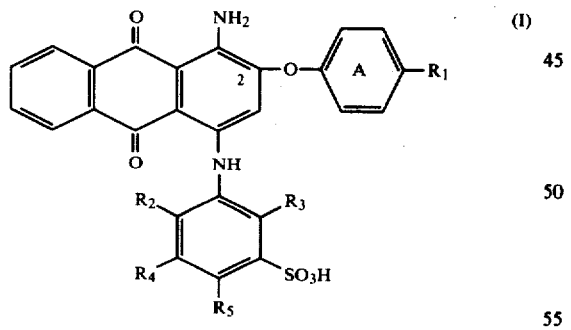

wherein
R₁ represents a straight-chain or branched-chain alkyl group having 4 to 8 carbon atoms,
R₂ and R₃ independently of one another represent a straight-chain or branched-chain alkyl group having 1 to 4 carbon atoms,
R₄ represents hydrogen, an optionally acylated amino group, or a fibre-reactive radical bonded by way of an amino group,
R₅ represents hydrogen, or a straight-chain or branched-chain alkyl group having 1 to 4 carbon atoms, and A can be further substituted,
which process comprises reacting an anthraquinone compound which, in the form of the free acid, corresponds to the formula II

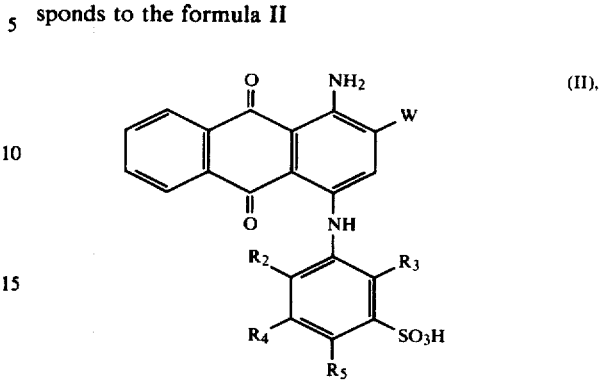

wherein the symbols $R_2$, $R_3$, $R_4$ and $R_5$ have the aforementioned meanings, and W represents the SO₃H group or halogen, particularly bromine, with a p-alkylphenol of the formula III

wherein $R_1$ has the meaning given above, in the presence of acid-binding agents, at elevated temperature, to given an anthraquinone dye of the formula Ia

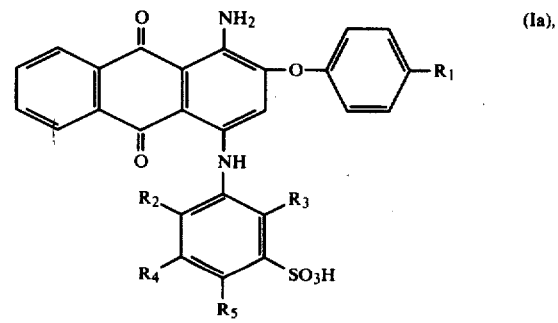

wherein the symbols $R_1$, $R_2$, $R_3$, $R_4$ and $R_5$ have the aforesaid meanings;

and optionally further substituting the phenylene ring of the phenoxy group in the 2-position of the anthraquinone nucleus.

9. A process according to claim 8, wherein the reaction of the anthraquinone compound of the formula II with the phenol of the formula III is performed at a temperature of 180° to 240°, particularly at 220° C.

10. Modification of the process for producing new water-soluble anthraquinone dyes according to claim 8, whereby an anthraquinone compound of the formula [IV]

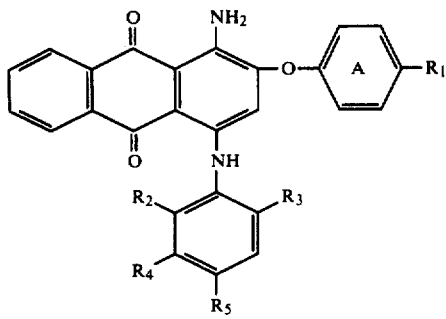

wherein the symbols $R_1$, $R_2$, $R_3$, $R_4$, $R_5$ and A have the aforesaid meanings, is selectively monosulphonated.

11. Process according to claim 10, wherein the selective monosulphonation of the anthraquinone compound of the formula IV is performed with oleum containing 1 to 65 percent by weight of free sulphur trioxide at a temperature of 0° to 5° C.

12. Process according to claim 11, wherein the selective monosulphonation of the anthraquinone compound of the formula II is performed with oleum containing 20 to 30, particularly 25, percent by weight of free sulphur trioxide.

13. Process according to claim 11, wherein the selective monosulphonation of the anthraquinone compound with oleum is performed at a temperature of 0° to 2° C.

14. Process according to claim 10, wherein the selective monosulphonation of the anthraquinone compound of the formula IV is performed with chlorosulphonic acid in a halogenated hydrocarbon at a temperature of 50° to 80° C.

15. Process according to claim 14, wherein the selective monosulphonation of the anthraquinone compound of the formula II which chlorosulphonic acid is performed in a halogenated aliphatic hydrocarbon.

16. Process according to claim 15, wherein the halogenated aliphatic hydrocarbon used is carbon tetrachloride.

17. Process according to claim 8, wherein an anthraquinone compound of the formula II in which $R_4$ represents an amino group which can be acylated is used as starting material; and, after reaction with the phenol of the formula III, the reaction product obtained is acylated.

18. Process according to claim 10, wherein an anthraquinone compound of the formula IV in which $R_4$ represents an amino group which can be acylated is used as starting material; and, after the selective monosulphonation, the product obtained is acylated.

19. An intermediate product of the formula [IV]

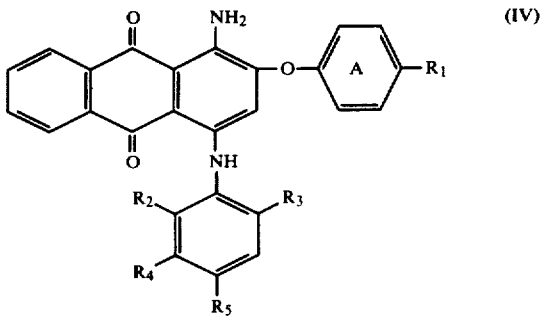

wherein
$R_1$ represents a straight or branched alkyl group having 4 to 8 carbon atoms,
$R_2$ and $R_3$ independently of one another represents a straight or branched alkyl group having 1 to 4 carbon atoms,
$R_4$ represents an optionally acylated amino group, or a fibre-reactive radical bonded by way of an amino group,
$R_5$ represents hydrogen, or a straight or branched alkyl group having 1 to 4 carbon atoms.

20. Use of water-soluble anthraquinone dyes according to claim 1, for dyeing or printing textile materials, particularly natural and synthetic polyamide materials.

21. The textile material, particularly natural or synthetic polyamide material, dyed or printed with the anthraquinone dyes according to claim 1.

* * * * *